March 24, 1942.  A. E. DRISSNER  2,277,085
SOLENOID OPERATED FEED STOP MECHANISM
Filed Dec. 8, 1939  4 Sheets-Sheet 1
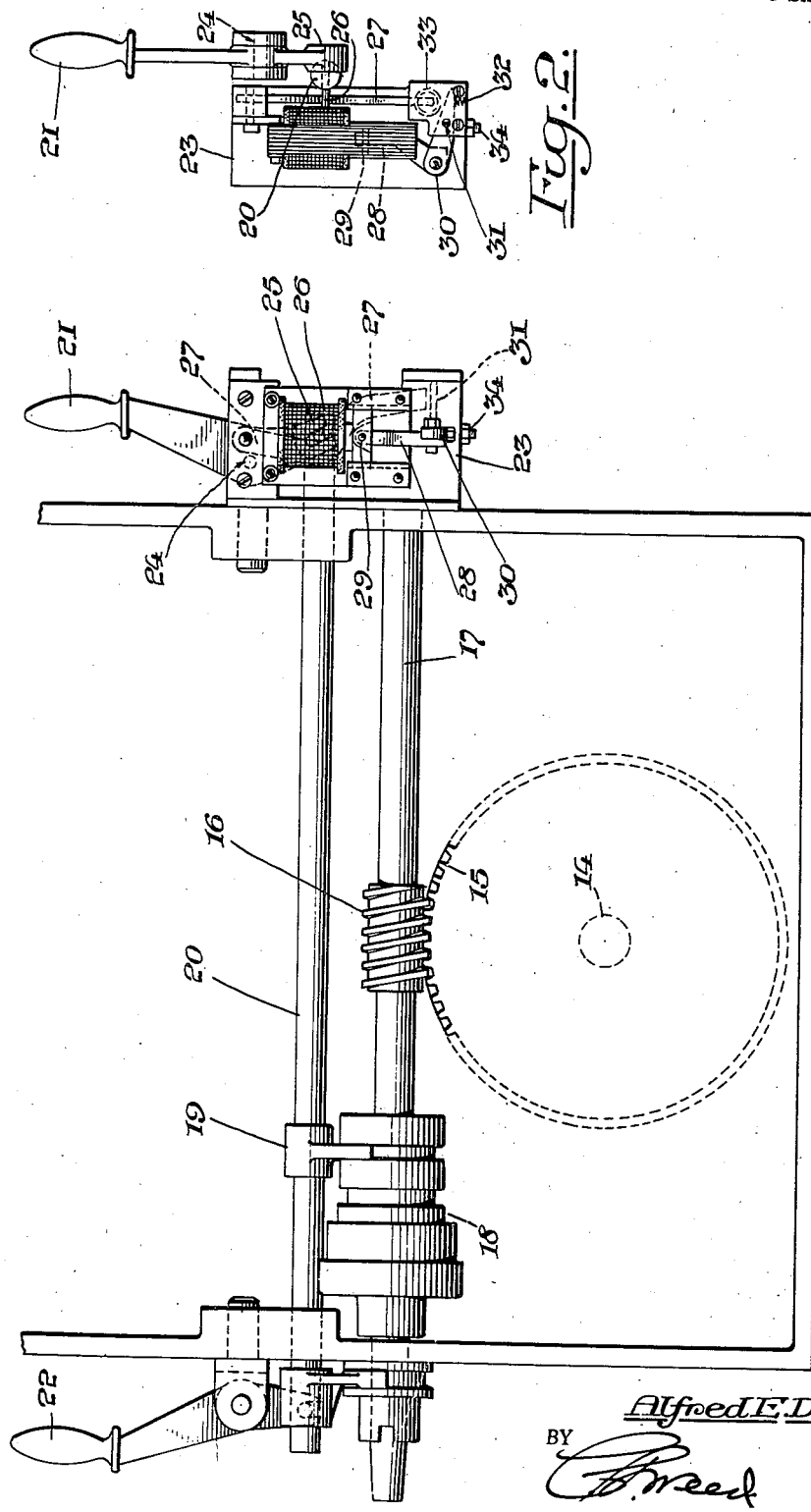
INVENTOR.
Alfred E. Drissner
BY 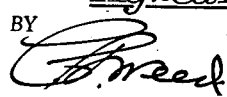
ATTORNEY.

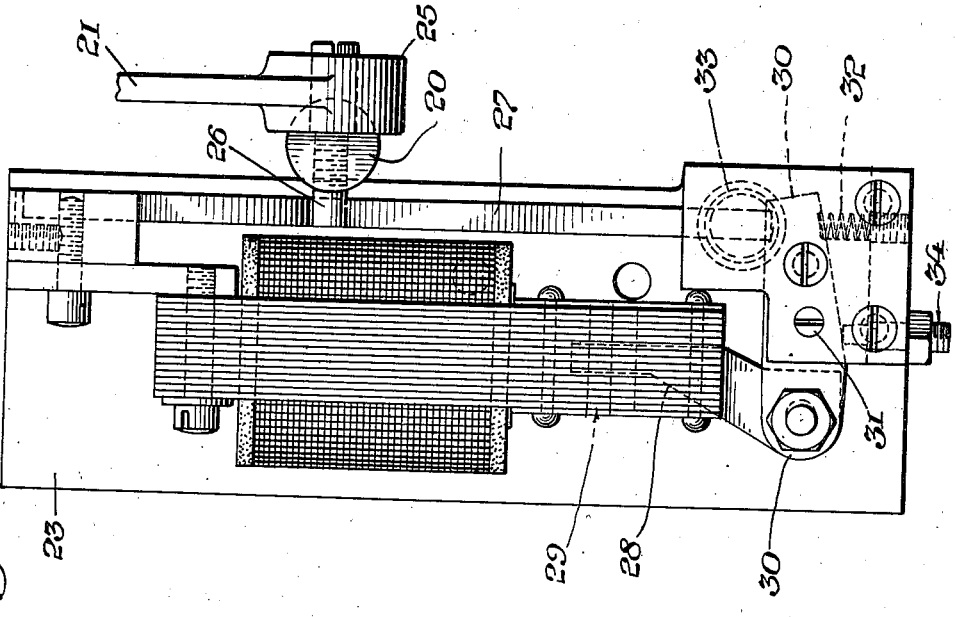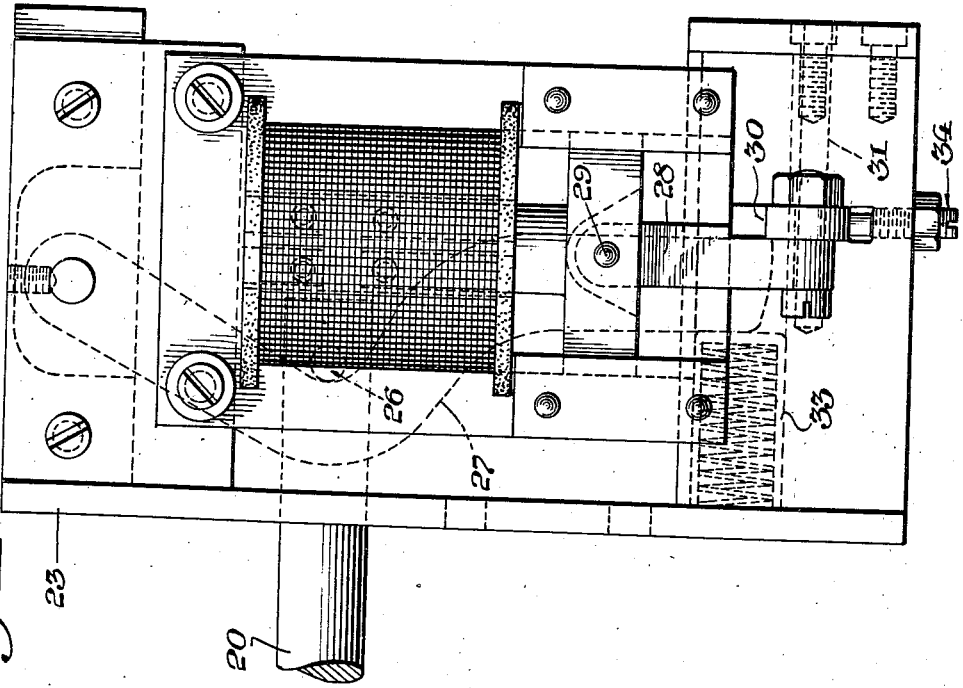

March 24, 1942.  A. E. DRISSNER  2,277,085
SOLENOID OPERATED FEED STOP MECHANISM
Filed Dec. 8, 1939  4 Sheets-Sheet 3

INVENTOR.
Alfred E. Drissner
BY
ATTORNEY.

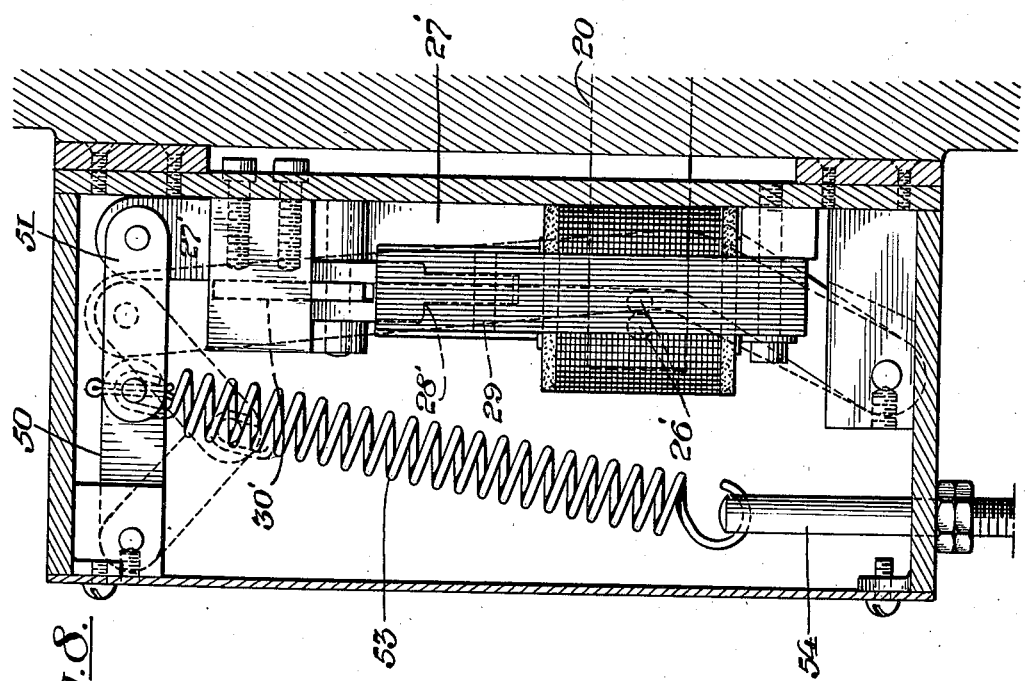
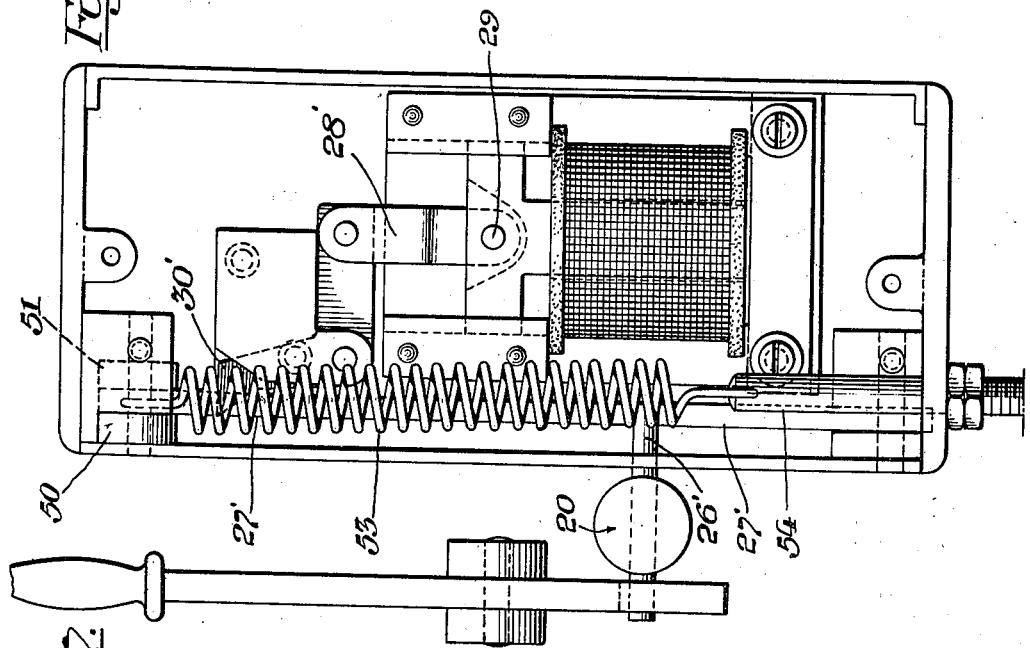

Patented Mar. 24, 1942

2,277,085

UNITED STATES PATENT OFFICE 2,277,085

SOLENOID OPERATED FEED STOP MECHANISM

Alfred E. Drissner, Cleveland, Ohio, assignor to The National Acme Company, Cleveland, Ohio, a corporation of Ohio Application December 8, 1939, Serial No. 308,156

27 Claims. (Cl. 29—64)

This invention relates to means for automatically stopping the feed mechanism of metal working machines and particularly to that class of machines in which a bar of stock is fed to the tools through a work carrying spindle such, for instance, as a multiple spindle screw machine, an object of the invention being to provide an improved, simple, easily applied automatically operated mechanism which will accomplish this result and has primarily to do with an improved electrically operated means utilizing a solenoid to control the shifting of the feed clutch of such a machine.

The principal object of the invention is the provision of a solenoid mechanism which includes within its unit the means for controlling the operation of the feed of a bar machine and while it may be used with various machines of this kind, it is particularly applicable to a multiple spindle bar machine in which the stock bar is fed through a rotary spindle of an indexible spindle carrier to the cutting tools, the solenoid mechanism being controlled by the bar feeding means of the machine, and which may be readily applied to a machine of this class without a reorganization or changing of any part of the machine or the feed mechanism thereof and is, therefore, simple, compact, readily applied as a single unit and inexpensive to manufacture.

A multiple spindle machine in the present instance is shown as having applied thereto this improvement and such a machine comprises, as is well known, an indexible spindle carrier having a series of rotary spindles through which the bar stock is fed to the tools carried by a sliding tool carrier and by side slides. For feeding the stock through the spindles to the tools, the rotary spindles of these multiple spindle machines carry feed tubes for the stock bars, each having a head carried between a feed ring and a feed shoe for shifting the feed tube forward and backward by means of a slide to feed the stock. Each feed tube is provided with a feed pusher which grips the stock so that when the feed slide and its tube are moved forward, the stock will be fed against a stock stop carried in front of the spindle carrier, various forms of which are in use.

While the stock bars may be of considerable length it frequently happens that when the bar has been nearly used up, a short piece of stock remains which is insufficient to form a completed piece of work and if permitted to remain in the machine is liable to cause a jamming of the machine or breakage of the tools so that it is essential that the operator be quickly advised of this condition.

After the last completed piece of work is cut off each bar and the remaining stock piece is too short for any practical purpose, the pusher on its backward movement pulls off this short piece of stock and consequently, during the next forward movement of the pusher, the short stock piece will not strike the stop usually provided for gauging the length of the work piece, thus permitting the pusher to move somewhat further forward and this movement of the pusher is utilized in the present improvement to operate the solenoid mechanism and stop the feed of the machine.

Heretofore, various methods have been used by my company to warn the operator when the stock is depleted as by using a signal light indicating such stock depletion. However, in this instance, the machine continued to run until manually stopped. Another method has been to arrange an electrical mechanism so as to stop the main drive motor and, thereby, the entire machine but with this method, the machine will gradually come to a stop until the momentum is exhausted and during this gradual stoppage, the momentum would at times carry the tools too far so that they would engage the stock and cause damage to the tools. In connection with these methods, I have also used a "Chronolog" mechanism for counting the pieces of stock.

The present improvement may be used in connection with any or all of these methods but, being operative entirely independently thereof, it, therefore, may be used without any or all of them since it operates when the stock becomes depleted or too short to throw out the clutch on the worm shaft of the machine and thus stops the cam shaft thereby preventing further feed of the tools so that the momentum of the machine is not transmitted to the tools.

In the drawings accompanying and forming a part of this specification,

Fig. 1 illustrates what may be termed the feed mechanism of a multiple spindle machine with this improved solenoid mechanism unit in position to control the clutch shifter thereof.

Fig. 2 is a view of this solenoid mechanism unit at right angles to that shown in Fig. 1.

Figs. 3 and 4 are enlarged views of the solenoid mechanism unit taken at right angles to each other.

Figs. 7 and 8 are views of the solenoid unit taken at right angles to each other and showing another form of spring actuated means, trigger controlled for shifting the clutch shifter.

Similar characters of reference indicate corresponding parts in the several views.

Figure 5:
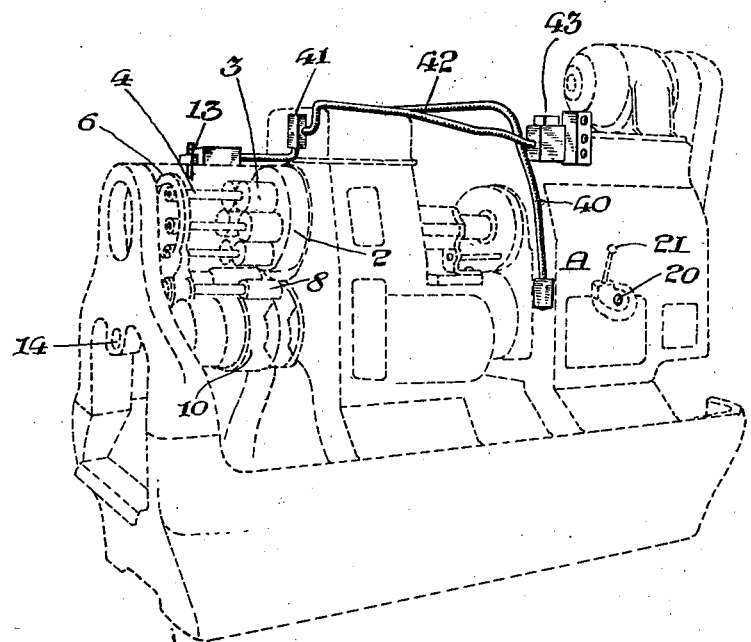
Fig. 5 illustrates a multiple spindle machine showing the application of this improved solenoid mechanism unit thereto.
Figure 6:
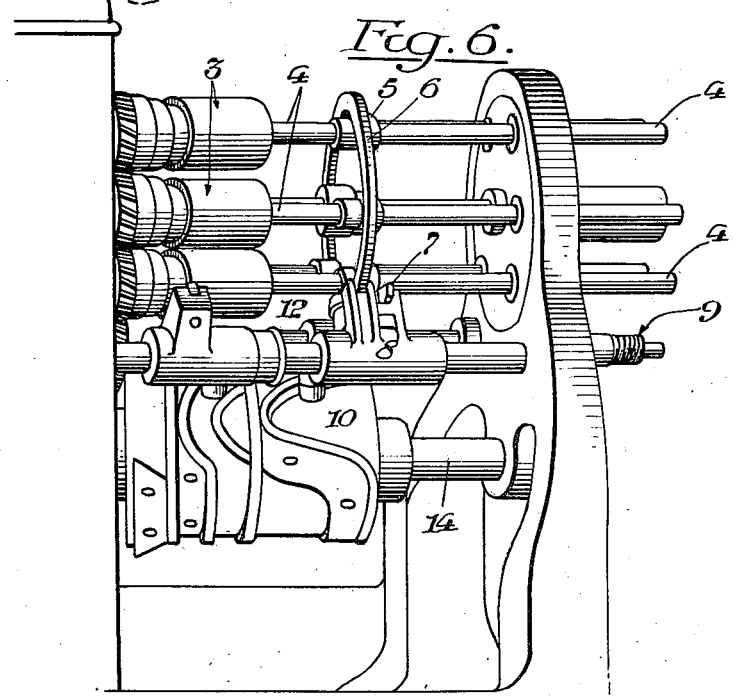
Fig. 6 is a detail view of the spindle carrier end of the machine, illustrating the manner in which the feed tubes and stock bars carried thereby are shifted.

Before explaining in detail the present improvement and mode of operation thereof, I desire it understood that the invention is not limited to the details of construction and arrangement of parts illustrated in the accompanying drawings since the invention is capable of other embodiments, and that the phraseology employed is for the purpose of description and not of limitation.

Since a multiple spindle machine is well known, a detailed showing and description thereof is not deemed necessary. However, such a machine is shown in U. S. Letters Patent No. 2,033,490, of March 10, 1936. It is provided with a stop for engaging the end of the piece to be operated upon and, as shown herein, has an indexible spindle carrier 2 having a series of rotary spindles 3 in which are located the feed tubes 4 for feeding the bars of stock. Each of these feed tubes is provided with a head 5 carried between a feed ring 6 and feed shoe 7 which, by means of a slide 8 and a spring 9, is shifted forwardly to feed the stock bar and by means of a cam 10, usually carried on the cam shaft of the machine, is shifted backwardly after each feed of the bar. Within the feed tube is a feed pusher, the forward end of which is usually provided with spring fingers in the form of a collet for gripping the stock bar and feeding it when the slide 8 is moved forward, thereby carrying the stock against a suitable stock stop.

When the last piece of work has been cut from the stock bar and the bar has become practically exhausted or "short" as it is called, the pusher on the backward movement pulls off of the stock bar. Consequently, during the next forward movement of the pusher, the remaining stock piece, being too short, will not strike the stop and this further forward or abnormal movement of the pusher which is limited by a stop 12 on the machine is utilized to control the operation of the solenoid mechanism unit by means of an open witch 13 carried by the frame of the machine and located directly in the path of and to be contacted by the feed ring 6 which, as before stated, is shifted forward by the spring 9 and returned by the cam 10. When this switch is open, the solenoid will not be energized so as to interfere with the normal functions of the machine but, upon further forward or abnormal movement of the pusher, the feed ring 6 contacts the switch and closes it thus energizing the solenoid which operates its mechanism to shift the clutch shifter.

Machines of the class described usually have a cam shaft 14 rotated by a worm wheel 15 rotated by a worm 16 carried on a transverse feed shaft 17 having a clutch 18 manually thrown into and out of engagement by a clutch shifter 19 carried by a rod 20 and shifted from one side of the machine by a hand lever 21 and from the opposite side by a similar lever 22 cooperating with this same clutch so that when either of these levers is manipulated, the clutch 18 is engaged or disengaged and, when disengaged, the feed shaft 17 is stopped and consequently the cam shaft 14, the cams of which control the feed of the tools and indexing of the rotary spindle carrier as well as other parts of a multiple spindle machine.

In the present instance, this improved solenoid mechanism is a complete and cased unit in itself so that it may be attached to or detached from without any change in the machine and in such a way that it will work in conjunction with one of the levers, as for instance the lever 21 which controls the feed mechanism, but not necessarily the stoppage of the entire machine although this may be effected when desired in the manner heretofore referred to. This solenoid mechanism unit is carried by a bracket 23 secured to the rear of the frame of the machine at the side of one end of the clutch shifter shaft 20, as at A, see Fig. 5.

The hand lever 21, suitably fulcrummed to the frame of the machine as at 24 has a forked end 25 in engagement with a pin 26 secured to the clutch shifter shaft 20 by means of which that shaft is operated. This pin 26 of the clutch shifter shaft 20 is also engaged by a pivoted lever 27 forming part of the solenoid unit and this lever automatically actuates the clutch shifter shaft 20 when the solenoid is energized and disengages the clutch 18 which is in the position shown in Fig. 1, Fig. 3 illustrating the position of this lever 27 before the clutch is disengaged and the feed thrown out.

When the stock bar is depleted, the feed ring and pusher moves forward into its abnormal position, whereupon the circuit to the solenoid is completed, which solenoid is thus energized thereby drawing the link 28 thereof upward, which link is fastened to the armature or core of the solenoid by the pin 29, its opposite end being pivoted to a trigger 30 which fulcrums on a pin 31, Figs. 1 to 4.

Before the solenoid is energized, the forward end of this trigger is held upward by a spring 32 so that it is in position to hold a spring pressed plunger 33 under compression. However, when the solenoid is energized and the link 28 drawn upward, the trigger 30 is swung away from the front of this spring pressed plunger 33 which thereupon shifts the lever 27 to shift the clutch rod 20 and disengages the clutch and so stops the feed mechanism since this lever 27 is, as before stated, connected with the pin 26 on the clutch shifter rod 20 whereupon the short piece of stock can be readily removed and as the chucking collet is open, the spindle can be reloaded with a new bar of stock.

The spring pressed plunger 33 is returned to its compressed position when the operator manually throws in the feed clutch by means of the lever 21 or 22, since the pin 26 then shifts the lever 27 in the opposite direction so that the lower end of the lever acting on the spring pressed plunger will compress it and permit the trigger to be shifted upwardly by its spring 32 and so lock the plunger in readiness again to operate the lever 27 to shift the clutch at the proper time. The feed can, of course, be thrown in or out as desired without interference by this automatic stop mechanism which operates only when the solenoid is energized. A stop screw 34 adjusts the position of the trigger.

This entire solenoid unit or assembly is housed in a small casing readily applied to the machine as at A, Fig. 5. Suitable electric wiring 40 leads from the solenoid to the switch box of the switch 13 through a light control box 41 from which a circuit 42 leads to a junction box 43 wherein the wires are connected with the source of electric energy, such circuits being so well understood that it is unnecessary to describe the same in detail herein.

From the foregoing, it will be seen that when the feed ring and its pusher are moved forward on the depletion of the stock, the ring contacts the switch 13, the solenoid is energized, the trigger released whereby the lever 27 by means of the spring pressed plunger 33 is shifted, thereby shifting the clutch rod 20, disengaging the clutch and stopping the feed mechanism of the machine.

In the form shown in Figs. 7 and 8, the lever 27', similar to that shown in the prior figures, actuates the clutch shifter rod 20 in the same manner as shown in said prior figures except that, in this instance, the clutch shifter rod is operated from the opposite side of the solenoid mechanism to that shown in Fig. 2 but carries the same pin 26' for engagement with the lever 27'.

The spring actuated means in this form, instead of comprising a spring plunger, consists of a pair of links 50 and 51, similar to toggle links, one pivoted to the casing and the other to the upper end of the lever 27' pivoted at its lower end to a fixed part in the casing, and pivotally connected at their inner ends, to the pivot of which, preferably between the levers, is connected the upper end of a coiled spring 53, the lower end of which is connected to the bottom wall of the casing and for this purpose, an adjusting device 54 is used, whereby the tension of the spring may be regulated.

The trigger 30' which, in this instance, is vertically instead of horizontally disposed as in the prior figures, is fulcrumed at its lower end and connected by a link 28' to the end of the armature or core of the solenoid, the trigger being normally in position to engage one edge of the lever 27' and so hold it against movement and, consequently, hold the spring actuated means 50, 51 and 53 in readiness to shift the lever 27' at the proper time by pull thereon instead of by pushing it as in the prior form.

When the solenoid is energized in the manner hereinbefore described, the armature or core thereof moves downwardly instead of upwardly as in the prior figures and shifts the trigger 30' by means of the link 28' out of the path of the lever 27' whereupon the spring 53 draws the links 50 and 51 downwardly and, consequently, shifts the lever 27' which, through the pin 26' of the clutch shifter rod 20, disengages the clutch.

Reengagement of the clutch is obtained when the clutch shifter rod 20 is shifted by hand in the manner hereinbefore described to shift the lever 27' into its normal position, thereby returning the links upwardly against the action of the spring 53, the lever then being relocked by the trigger 30' on de-energization of the solenoid.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same although without attempting to set forth all of the forms in which it may be made or all of the modes of its use, I claim:

1. In a machine of the class described having feed mechanism, the combination of means for automatically throwing said feed mechanism out of operation and comprising spring actuated means, means for holding said spring actuated means inoperative, a solenoid for releasing said holding means and to the core of which the holding means is shiftably connected, and means operated by said spring actuated means for throwing said feed mechanism out of operation on the abnormal operation of a part of the machine.

2. In a machine of the class described having feed mechanism, the combination of means for automatically throwing said feed mechanism out of operation and comprising spring actuated means, means for holding said spring actuated means inoperative, a solenoid for releasing said holding means and to the core of which the holding means is shiftably connected means operated by said spring actuated means for throwing said feed mechanism out of operation, and means for energizing the solenoid thereby to release said holding means during an abnormal operation of a part of the machine.

3. In a machine of the class described having feed mechanism and means for throwing it into and out of operation, the combination of means for automatically throwing said feed mechanism out of operation and comprising spring actuated means, means for holding said spring means inoperative, and a solenoid operative when energized to release said holding means and to the core of which the holding means is shiftably connected whereby the feed mechanism will be thrown out of operation.

4. In a machine of the class described having feed mechanism and means for throwing it into and out of operation, the combination of means for automatically throwing said feed mechanism out of operation and comprising a spring pressed plunger, means for holding said plunger under compression, and a solenoid operative when energized to release said holding means and to the core of which the holding means is shiftably connected whereby the feed mechanism will be thrown out of operation.

5. In a machine of the class described having feed mechanism and means for throwing it into and out of operation, the combination of means for automatically throwing said feed mechanism out of operation and comprising a lever, a spring actuated means for shifting said lever, means for holding said spring means inoperative, and a solenoid for releasing said holding means and to the core of which the holding means is shiftably connected thereby to permit the lever to throw the feed mechanism out of operation.

6. In a machine of the class described having feed mechanism and means for throwing it into and out of operation, the combination of means for automatically throwing said feed mechanism out of operation and comprising a lever, a spring pressed plunger for shifting said lever, means for holding said plunger under compression, and a solenoid for releasing said holding means and to the core of which the holding means is shiftably connected thereby to permit the plunger to shift the lever and throw the feed mechanism out of operation.

7. In a machine of the class described having means for feeding a bar of stock to be operated upon, feed mechanism, and means for throwing the feed mechanism into and out of operation, the combination of means for automatically throwing said feed mechanism out of operation on the abnormal feeding of the stock bar and comprising spring actuated means, means for holding said spring means inoperative, and a solenoid for releasing said holding means and to the core of which the holding means is shiftably connected whereby the feed mechanism will be thrown out of operation.

8. In a machine of the class described having means for feeding a bar of stock to be operated upon, feed mechanism, and means for throwing the feed mechanism into and out of operation, the combination of means for automatically throwing said feed mechanism out of operation on the abnormal feeding of the stock bar and comprising a spring pressed plunger, means for holding said plunger under compression, and a solenoid for releasing said holding means whereby the feed mechanism will be thrown out of operation.

9. In a machine of the class described having means for feeding a bar of stock to be operated upon, feed mechanism and means for throwing the feed mechanism into and out of operation, the combination of means for automatically throwing said feed mechanism out of operation on the abnormal feeding of the stock bar, and comprising a lever, a spring pressed plunger for shifting said lever, means for holding said plunger under compression, and a solenoid for releasing said holding means thereby to permit the plunger to shift the lever and throw the feed mechanism out of operation.

10. In a machine of the class described having means for feeding a bar of stock to be operated upon, feed mechanism including a clutch and a clutch shifter, means for shifting said clutch shifter and thereby the clutch into and out of operation, the combination of means for automatically shifting said clutch shifter thereby to throw the feed mechanism out of operation on the abnormal feeding of the stock bar and comprising a lever for shifting said clutch shifter, a spring pressed plunger for shifting said lever, a trigger for holding said plunger under compression, and a solnoid connected with said trigger for shifting it thereby to release said plunger and permit it to shift the lever and throw the feed mechanism out of operation.

11. In a machine of the class described having means for feeding a bar of stock to be operated upon, feed mechanism, and means for throwing the feed mechanism into and out of operation, the combination of means for automatically throwing said feed mechanism out of operation on the abnormal feeding of the stock bar and comprising spring actuated means, means for holding said spring means inoperative, a solenoid for releasing said holding means whereby the feed mechanism will be thrown out of operation, and means for energizing the solenoid on the feeding of the stock bar into abnormal position.

12. In a machine of the class described having means for feeding a bar of stock to be operated upon, feed mechanism and means for throwing the feed mechanism into and out of operation, the combination of means for automatically throwing said feed mechanism out of operation on the abnormal feeding of the stock bar and comprising a lever, a spring pressed plunger for shifting said lever, means for holding said plunger under compression, a solenoid for releasing said holding means thereby to permit the plunger to shift the lever and throw the feed mechanism out of operation, and means for energizing the solenoid on the feeding of the stock bar forwardly into an abnormal position.

13. In a machine of the class described having means for feeding a bar of stock to be operated upon, feed mechanism and means including a clutch and clutch shifter for throwing the feed mechanism into and out of operation, the combination of means for automatically throwing said feed mechanism out of operation on the abnormal feeding of the stock bar and consisting of a unit attachable to the machine and comprising a lever having direct connection with the clutch shifter, spring actuated means for shifting said lever, a trigger for holding said lever against movement, and a solenoid connected with said trigger for shifting it thereby to release said lever and permit it to shift the clutch shifter to throw the feed mechanism out of operation.

14. In a machine of the class described having means for feeding a bar of stock to be operated upon, feed mechanism including a clutch and a clutch shifter, means having direct connection with said shifter thereby to operate it to throw the clutch into and out of operation, the combination of means for automatically shifting said clutch shifter thereby to throw the feed mechanism out of operation on the abnormal feeding of the stock bar and consisting of a unit attachable to the machine and comprising a lever also having direct connection with said clutch shifter to throw said clutch out of operation, spring actuated means for shifting said lever, a trigger for holding said lever against movement, and a solenoid connected with said trigger for shifting it thereby to release said lever and permit it to shift the clutch shifter to throw the feed mechanism out of operation.

15. In a machine of the class described having means for feeding a bar of stock to be operated upon, feed mechanism and means for throwing the feed mechanism into and out of operation, the combination of means for automatically throwing said feed mechanism out of operation on the abnormal feeding of the stock bar and consisting of a unit attachable to the machine and comprising a casing and having therein a lever for throwing the feed mechanism out of operation, a spring pressed plunger for operating said lever, a trigger for holding said plunger under compression, and a solenoid for shifting said lever.

16. In a machine having feed mechanism and means for throwing it into and out of operation and including a clutch and a clutch shifter, the combination of means for automatically throwing the clutch out of operation and consisting of a unit attachable to the machine and comprising a lever having direct connection with the clutch shifter for shifting it, spring actuated means for operating said lever, means for locking said spring means in inoperative position, and electrically operated means for releasing said locking means.

17. In a machine of the class described having feed mechanism, the combination of means for automatically throwing said feed mechanism out of operation and comprising a pivoted lever cooperating with a part of said feed mechanism, a pair of toggle links connected with said lever, a spring for shifting said links, trigger means for holding said lever and the links in inoperative position, and a solenoid for releasing said trigger means whereby the spring will actuate the lever to throw out the feed mechanism.

18. In a machine of the class described having feed mechanism, the combination of means for automatically throwing said feed mechanism out of operation and comprising a lever cooperating with a part of said feed mechanism, a pair of toggle links connected with said lever, a spring for shifting said links, trigger means engaging said lever for holding it in its inoperative position, and a solenoid for releasing said trigger means whereby the spring will actuate the lever to throw out the feed mechanism.

19. In a machine of the class described having means for feeding a bar of stock to be operated upon, feed mechanism and means for throwing the feed mechanism into and out of operation, the combination of means for automatically throwing said feed mechanism out of operation on the abnormal feeding of the stock bar and comprising a lever cooperating with a part of said feed mechanism, a pair of toggle links connected with said lever, a spring for shifting said links, trigger means engaging said lever for holding it in its inoperative position, and a solenoid for releasing said trigger means whereby the spring will actuate the lever to throw out the feed mechanism.

20. In a machine of the class described having feed mechanism, means for controlling the operation of said feed mechanism, and means for automatically operating said controlling means and comprising spring actuated means, means for holding said spring actuated means inoperative, and a solenoid for releasing said holding means and to the core of which the holding means is shiftably connected.

21. In a machine of the class described having means for feeding a bar of stock to be operated upon, feed mechanism, means for controlling the operation of said feed mechanism and comprising spring actuated means, means for holding said spring actuated means inoperative, and a solenoid for releasing said holding means and to the core of which the holding means is shiftably connected on the abnormal feed of a stock bar.

22. In a machine of the class described having feed mechanism, means for controlling the operation of said feed mechanism, and means for automatically operating said controlling means and comprising spring actuated means, means for holding said spring actuated means inoperative, and a solenoid for releasing said holding means, said spring actuated means comprising a spring pressed plunger.

23. The structure of claim 22 in which said spring actuated means includes a pair of toggle links.

24. In combination with the feed shifting mechanism of a metal working machine, a solenoid unit for use therewith comprising a supporting mounting and assembled on said mounting to form a unit therewith, a feed shifting lever, spring operated means for shifting said lever, means for holding the spring operated means against movement, a solenoid, and means connected to the core thereof for shifting said holding means so that when the solenoid is energized, the holding means will release the spring operated means whereby the latter will shift the lever, the said solenoid unit being attachable and detachable as a unit.

25. The construction of claim 24 in which the spring operated means comprises a plunger.

26. The construction of claim 24 in which the means for holding the spring operated means against movement comprises a spring pressed trigger pivotally connected with the core of the solenoid.

27. In combination with the feed shifting mechanism of a metal working machine, a solenoid unit for use therewith comprising a supporting mounting, a feed shifting lever carried by said mounting, a pair of toggle links connected with said lever and with said mounting, a spring for shifting said links, trigger means for holding said lever and links in inoperative position, and a solenoid having its core connected with said trigger means thereby to shift the same to release the lever, said solenoid unit being attachable and detachable as a unit.

ALFRED E. DRISSNER.